F. Grosjean,
Spoon.
No. 1,727. Reissued July 12, 1864.
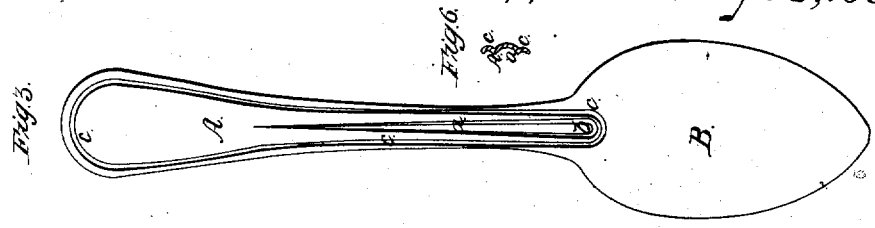
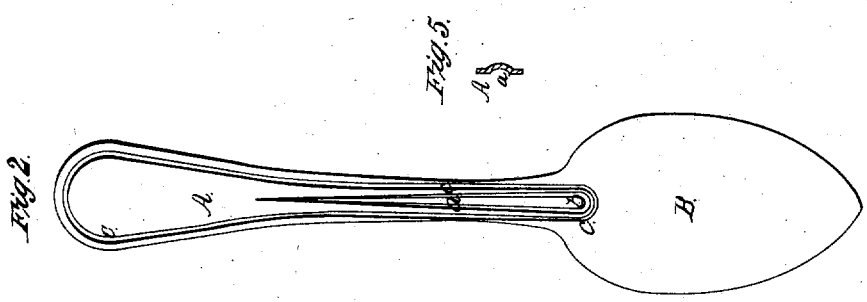
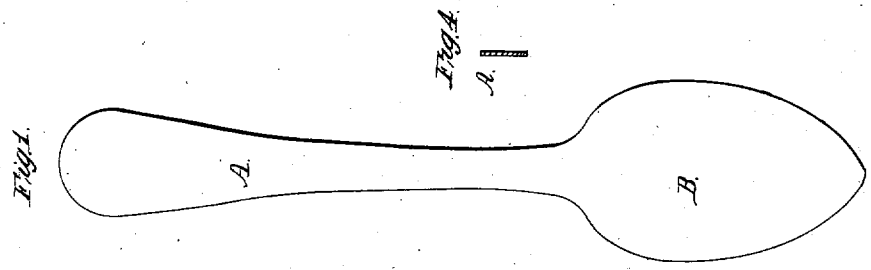
Witnesses:
C. B. Woodruff
W. Fay Ketcham
Inventor:
Florian Grosjean,
By his atty,
J. S. Brown,
N. PETERS, PHOTO-LITHOGRAPHER, WASHINGTON, D. C.

UNITED STATES PATENT OFFICE.

FLORIAN GROSJEAN, OF NEW YORK, N. Y.

IMPROVEMENT IN SPOONS AND FORKS.

Specification forming part of Letters Patent No. 34,252, dated January 28, 1862; Reissue No. 1,509, dated July 7, 1863; Reissue No. 1,727, dated July 12, 1864.

*To all whom it may concern:*

Be it known that I, FLORIAN GROSJEAN, of New York, in the county of New York and State of New York, have invented a new and useful Improvement in Constructing Sheet-Metal Spoons; and I do hereby declare that the following is a full and exact description thereof, reference being had to the accompanying drawings, making part of this specification—

Figure 1 being a plan of a blank piece of sheet metal from which a spoon is swaged; Fig. 2, a plan showing a spoon with my improvement in its simplest form; Fig. 3, a corresponding plan showing a spoon with my improvement in its most complete form; Figs. 4, 5, and 6, cross sections of the handles, respectively, of the articles shown in Figs. 1, 2, and 3.

Like letters designate corresponding parts in all the figures.

The nature of my invention consists in stamping or swaging spoons or folks from pieces of sheet metal with a middle, longitudinal corrugation or ridge in the narrow or weaker part of the handle, which corrugation is prolonged into the bowl of the spoon far enough to give the necessary or desired strength and finish to the junction of the handle and bowl, and either leaving the metal flat between the middle corrugation and the edges of the handle or forming a bead therein around the corrugation to give additional strength and finish to the spoon.

In the drawings the blank Fig. 1 has nothing peculiar in form.

The principal or essential feature of the invention is the middle corrugation or ridge, *a*, which extends from any suitable point toward the outer end of the handle A longitudinally along the narrow or weaker part thereof, and down into the bowl B of the spoon, as at *b*, far enough to give the necessary strength to the junction of the handle and bowl, but gradually shallowing out so as to leave the bowl sufficiently smooth where it may be.

The corrugation need not have any precise form, but may be varied in any manner consistent with the purpose designed to be effected by its use; but a general idea of a proper position, depth, and shape to be given to it is shown in Fig. 5. The handle is flat on both sides of the corrugation, (unless a bead is also made therein,) so that it is of neat, smooth, and otherwise desirable form.

Spoons of this simple construction, as in Fig. 2, are good and serviceable; but I generally prefer to add a bead, thread, or small corrugation, *c*, as indicated in Figs. 3 and 6, around the middle corrugation, near the edges of the handle. This bead would better also extend around the middle corrugation down in the bowl, and, for good appearance, it may also border the whole of the handle. It adds strength to the spoon-handle and to the junction of the handle and bowl, and gives a finish to the whole spoon, improving its appearance so that it is generally preferred; but I do not confine the construction to its use.

The whole improvement is obviously applicable also to forks made of sheet metal, the blade or tine portion taking the place of the spoon-bowl.

The improvement enables spoons and forks of great strength, durability, and good shape to be made in the cheapest manner known.

I do not claim mere beads or ornaments formed in or on the surface of spoon and fork handles made of rolled or cast metal, nor do I claim any indentations in sheet-metal spoon-handles not intended for nor accomplishing the purposes herein set forth; but

What I claim as my invention, and desire to secure by Letters Patent, is—

Stamping or swaging spoons or forks from pieces of sheet metal with middle longitudinal corrugations or ridges extending along the narrow or weaker part of the handle and prolonged into the bowl thereof, so as to give proper strength and finish to the junction of the handle and bowl, either leaving the metal flat around the corrugation or forming a bead therein, substantially as and for the purposes herein specified.

F. GROSJEAN.

Witnesses:
A. PERRIN,
J. P. CORDIER.